(12) United States Patent
Shimizu et al.

(10) Patent No.: US 11,217,835 B2
(45) Date of Patent: Jan. 4, 2022

(54) HEAT DISSIPATING STRUCTURE AND BATTERY COMPRISING THE SAME

(71) Applicant: SHIN-ETSU POLYMER CO., LTD., Tokyo (JP)

(72) Inventors: Takao Shimizu, Saitama (JP); Hitoshi Ando, Saitama (JP)

(73) Assignee: SHIN-ETSU POLYMER CO., LTD., Tokyo (JP)

( * ) Notice: Subject to any disclaimer, the term of this patent is extended or adjusted under 35 U.S.C. 154(b) by 258 days.

(21) Appl. No.: 16/221,501

(22) Filed: Dec. 15, 2018

(65) Prior Publication Data

US 2019/0190094 A1     Jun. 20, 2019

(30) Foreign Application Priority Data

Dec. 15, 2017 (JP) .................. 2017-240308

(51) Int. Cl.
*H01M 10/613* (2014.01)
*H01M 10/625* (2014.01)
(Continued)

(52) U.S. Cl.
CPC ..... *H01M 10/613* (2015.04); *H01M 10/0525* (2013.01); *H01M 10/625* (2015.04);
(Continued)

(58) Field of Classification Search
CPC ............. H01M 10/613; H01M 10/625; H01M 10/0525
See application file for complete search history.

(56) References Cited

U.S. PATENT DOCUMENTS

2005/0231159 A1* 10/2005 Jones ............... H04M 1/04
320/114
2011/0008666 A1    1/2011 Yoon et al.
(Continued)

FOREIGN PATENT DOCUMENTS

JP          201351099 A      3/2013
JP          2013-118189 A    6/2013
(Continued)

OTHER PUBLICATIONS

Flummer, "Battery box for AA cells byflummer", [online], [retrieved on Jan. 26, 2021]. Retrieved from the Internet:<URL: https://www.thingiverse.com/thing:331394; https://www.digikey.com/en/products/detail/keystoneelectronics/5209/299941?s=N4IgTCBcDalKxgAwE4QF0C%2BQ>, pp. 1-10 (Year: 2014).*
(Continued)

*Primary Examiner* — Tae-Sik Kang
(74) *Attorney, Agent, or Firm* — Hauptman Ham, LLP (57) ABSTRACT

Provided are a heat dissipating structure that deforms to detachably come close contact with the battery cells, is disposed between the battery cells and a cooling member in order to reduce a risk of leakage of liquid inside the battery cells, and is excellent in heat dissipating property, and a battery including the heat dissipating structure. The present invention relates to a heat dissipating structure that is provided between battery cells and a cooling member, conducts heat from the battery cells to the cooling member to promote heat dissipation from the battery cells, and includes holding members detachably holding end parts of the respective battery cells, and to a battery including the heat dissipation structure.

27 Claims, 8 Drawing Sheets

(51) Int. Cl.
   *H01M 10/0525*   (2010.01)
   *H01M 10/6556*   (2014.01)
   *H01M 10/6567*   (2014.01)
   *H01M 10/6555*   (2014.01)
   *H01M 10/6554*   (2014.01)
   *H01M 50/10*     (2021.01)

(52) U.S. Cl.
   CPC ... *H01M 10/6554* (2015.04); *H01M 10/6555* (2015.04); *H01M 10/6556* (2015.04); *H01M 10/6567* (2015.04); *H01M 50/10* (2021.01); *H01M 2220/20* (2013.01)

(56) References Cited

U.S. PATENT DOCUMENTS

2012/0234613 A1   9/2012   Miyatake
2014/0099527 A1*  4/2014   Seong ................ H01M 10/613
                                                   429/120

FOREIGN PATENT DOCUMENTS

JP    201493239 A    5/2014
WO    2011070758 A1  6/2011

OTHER PUBLICATIONS

"1.2V 1400mAh NiMH Rechargeable Gumstick Battery x1", DoublePOW on Ebay, [online], [retrieved on Jun. 7, 2021]. Retrieved from the Internet:<URL: https://www.ebay.com/itm/313522135764?epid=8046805506&hash=item48ff6022d4:g:DqUAAOSwHotglk93>, pp. 1-5. (Year: 2021).*

* cited by examiner

HEAT DISSIPATING STRUCTURE AND BATTERY COMPRISING THE SAME

CROSS REFERENCE

The present application claims the benefit of priorities of Japanese Patent Application No. 2017-240308 filed on Dec. 15, 2017 in Japan, the entire contents of which are incorporated herein by reference. The entire contents of patents, patent applications, and literatures cited in the present application are also incorporated herein by reference.

TECHNICAL FIELD

The present invention relates to a heat dissipating structure and a battery provided with the same.

RELATED ART

For load reduction to grovel environment, a movement to gradually convert existing gasoline-powered vehicles or diesel-powered vehicles to electric vehicles has been currently increasing all over the world. In particular, in addition to various European countries including France, Netherlands, and Germany, China has made a declaration of conversion from gasoline-powered vehicles and diesel-powered vehicles to electric vehicles by 2040. To widely spread the electric vehicles, there are issues such as installation of a large number of charging stands, in addition to development of a high-performance battery. In particular, development of technology to enhance charging-discharging functions of a lithium vehicle battery is a major issue. It is well-known that the above-described vehicle battery cannot sufficiently exert the charging-discharging functions under high temperature of 60° C. or more. Therefore, enhancement of heat dissipating property (i.e., heat removal characteristics) is considered to be important in the battery.

To achieve rapid heat dissipation of the battery, a structure in which a water-cooling pipe is disposed in a metal housing excellent in thermal conductivity such as aluminum, a large number of battery cells are disposed in the housing, and an adhesive rubber sheet is sandwiched between the battery cells and a bottom surface of the housing is adopted.

Further, in recent years, a battery cell including a laminated structure of a resin layer and a metal layer has been developed. Such a battery cell includes a bag shape and includes a structure in which an outer periphery (in particular, upper end part and lower end part) is sealed. Accordingly, in a case where a structure through which cooling water flows is provided on, for example, the bottom part of the housing mounted with the battery cells, there is an issue that adhesiveness between the lower end parts of the respective battery cells and the part where the cooling water flows is deteriorated. To solve such an issue, a method of connecting a heat conductive member to the lower end parts of the respective battery cells (refer to Japanese Patent Laid-Open No. 2013-118189).

The heat dissipating structure disclosed in Japanese Patent Laid-Open No. 2013-118189, however, includes issues to be solved. As a first issue, when the heat conductive member is bonded to the sealed parts of the respective battery cells, the heat conductive member is inevitably discarded together with the battery cells in exchange of the battery cells. As a second issue, when the heat conductive member is inserted and fixed between upper and lower sheets of the sealed part, a risk causing leakage of liquid inside the battery cells is enhanced, in addition to the above-described first issue.

The present invention is made in consideration of the above-described issues, and an object of the present invention is to provide a heat dissipating structure that deforms to detachably come close contact with the battery cells, is disposed between the battery cells and a cooling member in order to reduce the risk of leakage of liquid inside the battery cells, and is excellent in heat dissipating property, and to provide a battery provided with the heat dissipating structure.

SUMMARY (1) A heat dissipating structure according to an embodiment for achieving the above-described object is a heat dissipating structure that is provided between battery cells and a cooling member, and conducts heat from the battery cells to the cooling member to promote heat dissipation from the battery cells, and includes holding members configured to detachably hold end parts of the respective battery cells. In the present application, the term "heat dissipating structure" indicates a member to cause the battery cells as an example of a heat source to rapidly dissipate heat. The heat dissipating structure may be paraphrased as a heat transfer structure or a heat transfer member that transfers the heat from the battery cells to the cooling member.

(2) In the heat dissipating structure according to another embodiment, the above-described holding members preferably elastically deform to hold, from both sides, projection pieces on outer peripheries of the respective bag-shaped battery cells.

(3) In the heat dissipating structure according to another embodiment, any of the above-described holding members is preferably mainly made of a rubber-like elastic body.

(4) The heat dissipating structure according to another embodiment preferably further includes a sheet that includes a plurality of the above-described holding members and is in contact with the cooling member side.

(5) The heat dissipating structure according to another embodiment preferably further includes heat dissipating plates disposed in respective gaps among any of the above-described battery cells.

(6) In the heat dissipating structure according to another embodiment, the above-described heat dissipating plates each preferably include a thickness causing the heat dissipating plate to be in closer contact with the battery cells during heat generation of the battery cells more than before the heat generation.

(7) A battery according to an embodiment includes battery cells inside a housing that causes contact with a cooling member, and includes a heat dissipating structure that is provided between end parts of the respective battery cells on side close to the cooling member and a part of the housing on the side close to the cooling member and conducts heat from the battery cells to the cooling member to promote heat dissipation from the battery cells, and the heat dissipating structure includes holding members that detachably hold the end parts of the respective battery cells.

(8) In the battery according to another embodiment, the above-described holding members preferably elastically deform to hold, from both sides, projection pieces on outer peripheries of the respective bag-shaped battery cells.

(9) In the battery according to another embodiment, any of the above-described holding members is preferably mainly made of a rubber-like elastic body.

(10) The battery according to another embodiment preferably further includes a sheet that includes a plurality of the above-described holding members and is in contact with the cooling member side.

(11) The battery according to another embodiment preferably further includes heat dissipating plates disposed in respective gaps among any of the above-described battery cells.

(12) In the battery according to another embodiment, the above-described heat dissipating plates each preferably include a thickness causing the heat dissipating plate to be in closer contact with the battery cells during heat generation of the battery cells more than before the heat generation.

Advantageous Effect of Invention

According to the present invention, it is possible to provide the heat dissipating structure that deforms to detachably come close contact with the battery cells, is disposed between the battery cells and the cooling member in order to reduce the risk of leakage of liquid inside the battery cells, and is excellent in heat dissipating property, and to provide the battery provided with the heat dissipating structure.

DETAILED DESCRIPTION

Some embodiments of the present invention are described with reference to drawings. Note that the embodiments described below do not limit the invention according to claims, and all of components described in the embodiments and combinations thereof are not necessarily essential for solution of the present invention.

First Embodiment

Figure 1:
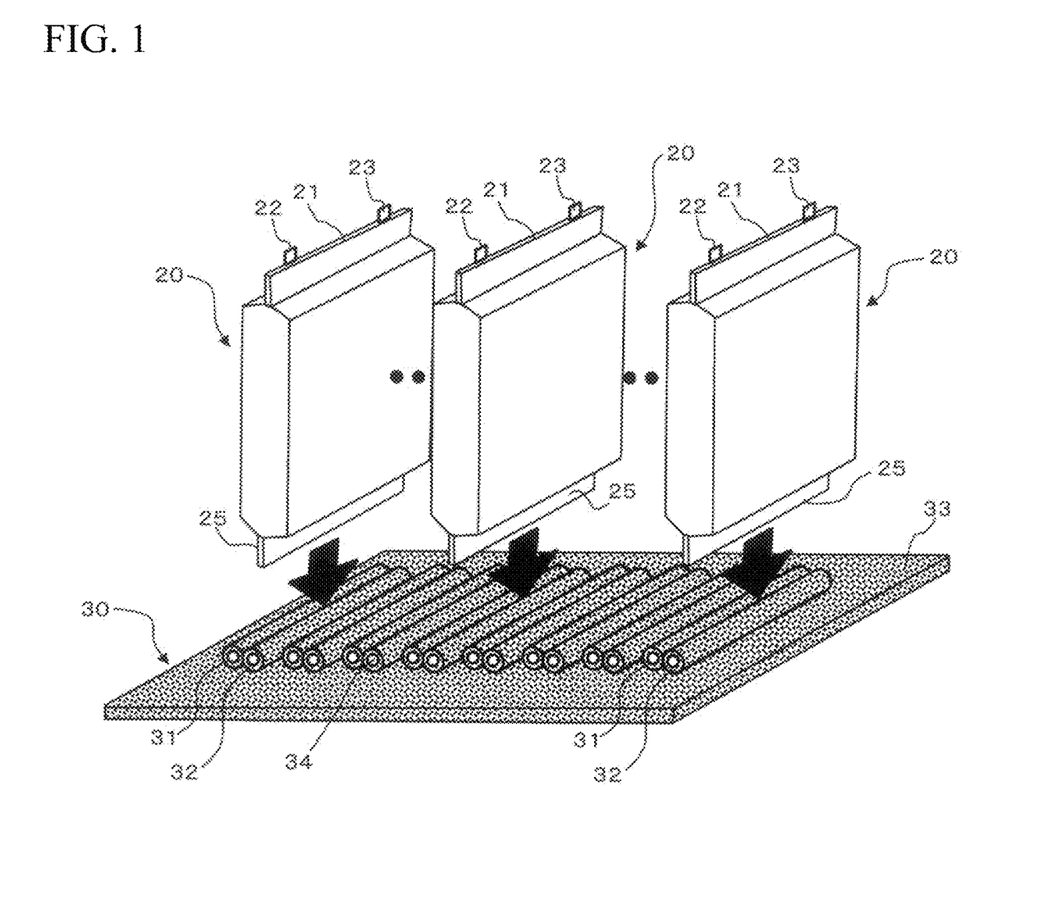
FIG. 1 is a perspective view illustrating a situation where battery cells are attached to a heat dissipating structure according to a first embodiment.
Figure 2:
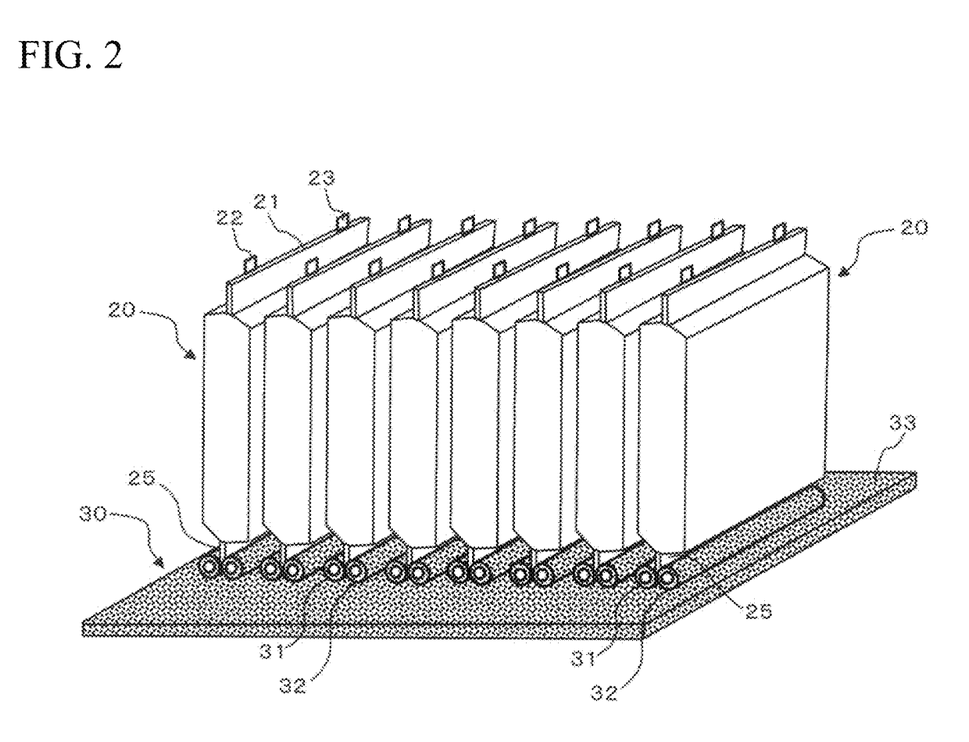
FIG. 2 is a perspective view illustrating a state where the battery cells have been attached to the heat dissipating structure through the situation of FIG. 1.
Figure 3:
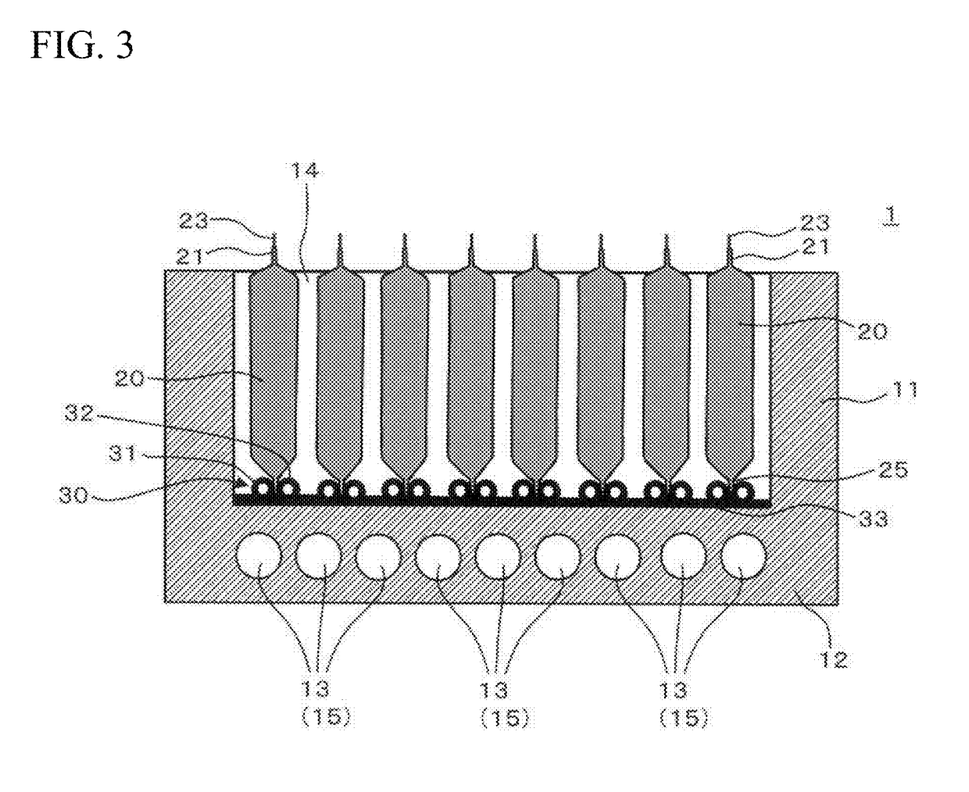
FIG. 3 is a vertical cross-sectional view of a battery including the heat dissipating structure of FIG. 1.

FIG. 1 is a perspective view illustrating a situation where battery cells are attached to a heat dissipating structure according to a first embodiment. FIG. 2 is a perspective view illustrating a state where the battery cells have been attached to the heat dissipating structure through the situation of FIG. 1. FIG. 3 is a vertical cross-sectional view of a battery including the heat dissipating structure of FIG. 1.

A heat dissipating structure 30 according to the first embodiment is a structure that is provided between battery cells 20 and a cooling member 15 and conducts heat from the battery cells 20 to the cooling member 15 to promote heat dissipation from the battery cells 20. The heat dissipating structure 30 includes holding members 31 and 32 that detachably hold end parts of the respective battery cells 20. The holding members 31 and 32 preferably elastically deform to hold, from both sides, projection pieces 25 (examples of end parts of battery cells 20) on outer peripheries of the respective bag-shaped battery cells 20. The battery cells 20, the heat dissipating structure 30, and a battery 1 are described below.

(1) Battery Cell

The battery cells 20 are components of the battery 1 but are not components of the heat dissipating structure 30. In the present embodiment, each of the battery cells 20 is preferably a bag-shaped cell including a laminated structure of a resin layer and a metal layer. Each of the battery cells 20 includes, on the outer periphery thereof, a sealing edge that seals the bag. The sealing edge may be provided over an entire circumference of each of the battery cells 20; however, is provided on an upper end part and a lower end part in a vertical direction of FIG. 1 in the present embodiment. Each of the battery cells 20 includes, at the upper end part, a projection piece 21 as the sealing edge. Each of the battery cells 20 includes, near the projection piece 21, two electrodes 22 and 23 that are exposed from an inside of the cell to outside. Each of the battery cells 20 includes, also at the lower end part, the projection piece 25 as the sealing edge. The heat dissipating structure 30 includes a structure that can hold the projection pieces 25 located on the lower end parts of the respective battery cells 20 from both sides thereof.

(2) Heat Dissipating Structure

The heat dissipating structure 30 includes the holding members 31 and 32 and a sheet 33 that includes a plurality of the holding members 31 and 32. In at least one embodiment, the sheet 33 is also called a support structure. In the present embodiment, the holding members 31 and 32 and the sheet 33 are each mainly made of a rubber-like elastic body. The term "mainly" indicates that the rubber-like elastic body occupies a region exceeding 50% (including 100%) in a volume ratio, and materials other than the rubber-like elastic body occupy a remaining region (including 0%). In the present embodiment, each of the holding members 31 and 32 is preferably a cylindrical pipe. Each pipe includes a through hole 34 that penetrates through both ends of the pipe at a position of a center axis. One set of the holding members 31 and 32 holds the projection piece 25 of one battery cell 20. As illustrated in FIG. 2 and FIG. 3, the battery 1 includes eight battery cells 20 in the present embodiment. Accordingly, the heat dissipating structure 30 includes eight sets of the holding members 31 and 32 (16 holding members in total) on the sheet 33. Note that FIG. 1 illustrates only three battery cells 20, and illustration of remaining five battery cells 20 is omitted.

The holding members 31 and 32 each preferably include a length equal to or greater than a length of each of the projection pieces 25 in order to efficiently transfer heat that has been transferred from the battery cells 20 to the projection pieces 25, to the holding members 31 and 32. The length of each of the holding members 31 and 32, however, may be made smaller than the length of each of the projection pieces 25. A gap between sets of the holding members 31 and 32 is generally larger than a gap between the holding members 31 and 32 of the set. This is because, when a thickness of each the projection pieces 25 and a thickness of each of the battery cells 20 are compared, the thickness of each of the battery cells 20 is generally greatly larger than the thickness of each of the projection pieces 25. Since each of the holding members 31 and 32 is mainly made of the rubber-like elastic body and includes the through hole 34, the gap between the holding members 31 and 32 of the set is easily changeable when the corresponding projection piece 25 is inserted or extracted. Accordingly, the holding members 31 and 32 of the set are provided with the gap slightly smaller than the thickness of each of the projection pieces 25, which makes it possible to bring the holding members 31 and 32 into close contact with the both surfaces of the corresponding projection piece 25 when the projection pieces 25 are inserted. As a result, it is possible to efficiently transfer the heat from the battery cells 20 to the holding members 31 and 32.

The sheet 33 includes the eight sets of holding members 31 and 32, and comes into contact with the cooling member 15 side (inner surface of bottom part 12 of housing 11 illustrated in FIG. 3) of the housing 11 of the battery 1. The sheet 33 is not particularly restricted in area, and preferably has a size where all of the holding members 31 and 32 can be fixed. The sheet 33 is not particularly restricted in thickness, but preferably has a thickness as small as possible in order to quickly transfer the heat transferred to the holding members 31 and 32, to the bottom part 12 and the cooling member 15.

The rubber-like elastic body mainly configuring the holding members 31 and 32 and/or the sheet 33 preferably contains a thermosetting elastomer such as silicone rubber, urethane rubber, isoprene rubber, ethylene-propylene rubber, natural rubber, ethylene propylene diene rubber, nitrile rubber (NBR), and styrene-butadiene rubber (SBR), thermoplastic elastomer such as urethane-based elastomer, ester-based elastomer, styrene-based elastomer, olefin-based elastomer, butadiene-based elastomer, and fluorine-based elastomer, or a composite thereof. The rubber-like elastic body preferably contains a material with high heat resistance sufficient to maintain the state of the holding members 31 and 32 and the sheet 33 without melting, decomposition, etc. due to transferred heat. In the present embodiment, the rubber-like elastic body more preferably contains urethane-based elastomer impregnated with silicone, or silicone rubber. To enhance thermal conductivity of the rubber-like elastic body even a little, various kinds of particles of AlN, alumina, aluminum hydroxide, aluminum, cBN, hBN, graphite, carbon, diamond, silicon nitride, copper, or silver, or a filler represented by a fibrous filler, whisker, and a plate-like filler are preferably dispersed in the rubber.

At least one of the holding members 31 and 32 and the sheet 33 may be made of a material other than the rubber-like elastic body, for example, a metal, a ceramic, a carbon material, or a hard resin. In a case where the holding members 31 and 32 or the sheet 33 is made of a metal, a metal with relatively high thermal conductivity, such as aluminum, an aluminum alloy, copper, and a copper alloy can be used. In a case where the holding members 31 and 32 or the sheet 33 is made of a ceramic, the holding members 31 and 32 or the sheet 33 can be formed of aluminum nitride, cBN, alumina, etc. in order to use high thermal conductivity even though elastic deformation is difficult to be used. In a case where the holding members 31 and 32 or the sheet 33 is made of a carbon material, the holding members 31 and 32 or the sheet 33 can be formed of a sheet stacked body or a constituent body in which fibers are dispersed or fibers are knitted, in addition to a molded body made of diamond-like carbon, diamond, graphite, or the like. In a case where the holding members 31 and 32 or the sheet 33 is made of a hard resin, a resin with high heat resistance is preferably used as a base material, and a ceramic, a metal, or a carbon material with thermal conductivity higher than the thermal conductivity of the resin is preferably dispersed into the base material.

(3) Battery

The battery 1 according to the present embodiment includes the battery cells 20 inside the housing 11 that causes contact with the cooling member 15, and includes the heat dissipating structure 30 between the end parts of the respective battery cells 20 on side close to the cooling member 15 and a part (bottom part 12) of the housing 11 on the side close to the cooling member 15. The heat dissipating structure 30 conducts heat from the battery cells 20 to the cooling member 15 to promote heat dissipation from the battery cells 20. The heat dissipating structure 30 includes the holding members 31 and 32 that detachably hold the end parts of the respective battery cells 20. A configuration of the battery 1 is described in detail below.

In the present embodiment, the battery 1 is, for example, a battery for an electric vehicle, and includes the eight battery cells 20. The number of battery cells 20, however, may be one, two to seven, or nine or more (e.g., 100). The battery 1 includes the bottomed housing 11 that includes an opening on one side. The housing 11 is preferably made of aluminum or an aluminum base alloy. The battery cells 20 are disposed adjacent to one another in an inside 14 of the housing 11. As described above, the electrodes 22 and 23 are projected and provided at the upper part of each of the battery cells 20. One or a plurality of water-cooling pipes 13 through which cooling water as an example of the cooling member 15 flows are provided on the bottom part 12 of the housing 11. The battery cells 20 are disposed inside the housing 11 so as to sandwich the heat dissipating structure 30 between the battery cells 20 and the bottom part 12. The battery cells 20 are retained in a state where the respective projection pieces 25 located on the lower end parts are held by the holding members 31 and 32, and vicinities of the upper end parts are held by an upper fixing member unillustrated in FIG. 3. Accordingly, the battery cells 20 are fixed in the inside 14 of the housing 11 while standing at predetermined intervals from one another. In the battery 1 including such a structure, the heat of the battery cells 20 is transferred to the housing 11 through the heat dissipating structure 30 and is effectively removed by water cooling. Note that the cooling member 15 is not limited to the cooling water, and may be interpreted to include liquid nitrogen or an organic solvent such as ethanol. The cooling member 15 is not limited to liquid under the circumference where the cooling member 15 is used for cooling, and may be gas or a solid. Further, the term "cooling member" of the present application can be interpreted as not the water etc. flowing through the water-cooling pipes 13 but as the bottom part 12 including the water-cooling pipes 13.

Second Embodiment

Next, a second embodiment of the present invention is described.

Figure 4:
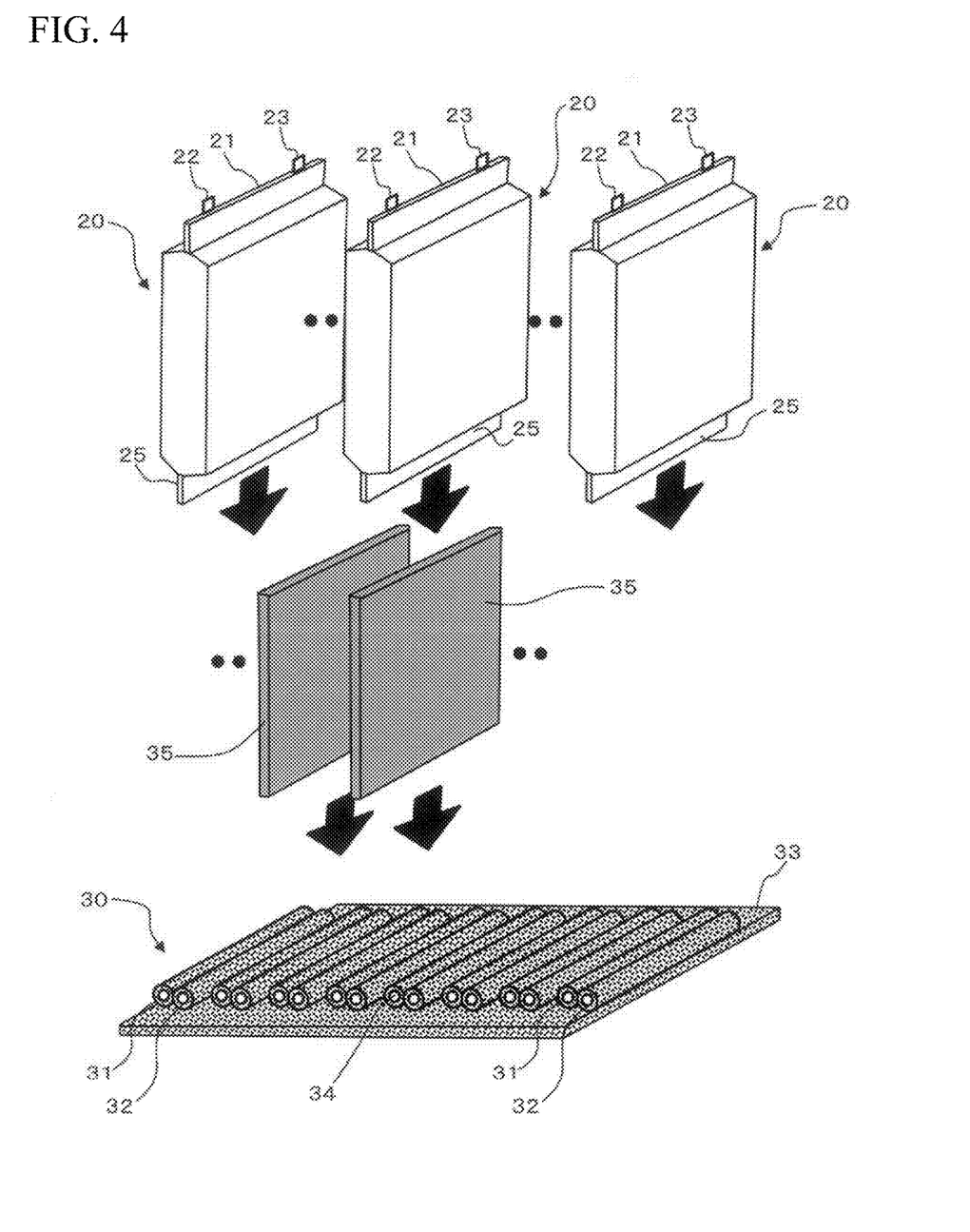
FIG. 4 is a perspective view illustrating an assembling situation of a heat dissipating structure and a situation where battery cells are attached to the heat dissipating structure according to a second embodiment.
Figure 5:
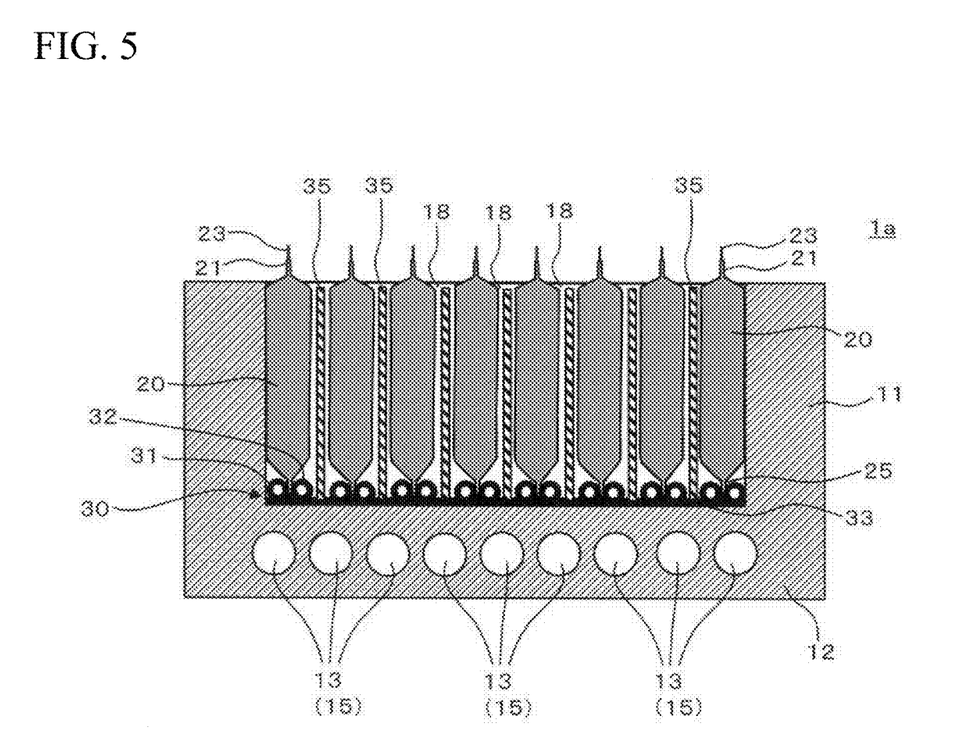
FIG. 5 is a vertical cross-sectional view of a battery including the heat dissipating structure of FIG. 4.

FIG. 4 is a perspective view illustrating an assembling situation of a heat dissipating structure and a situation where battery cells are attached to the heat dissipating structure according to the second embodiment. FIG. 5 is a vertical cross-sectional view of a battery including the heat dissipating structure of FIG. 4.

The second embodiment is different from the first embodiment in that heat dissipating plates are further provided among the battery cells 20 of the first embodiment. Other configurations are substantially common to the first embodiment and the second embodiment. Accordingly, matters relating to the heat dissipating plates are mainly described below, and overlapped description for the other configurations are omitted through replacement with the above-described description in the first embodiment.

A battery 1a according to the second embodiment includes the heat dissipating structure 30 that further includes heat dissipating plates 35 disposed in respective gaps 18 among the battery cells 20. The heat dissipating plates 35 stand on the sheet 33. Joining of the heat dissipating plates 35 and the sheet 33 is not particularly restricted, and is achieved by bonding, fitting, or integral molding without any adhesive. Each of the heat dissipating plates 35 is provided between the sets of holding members 31 and 32. In the battery 1a, the heat dissipating plates 35 are disposed only in the respective gaps 18 among the battery cells 20; however, may be disposed between an inner surface of the housing 11 and the corresponding battery cell 20.

Each of the heat dissipating plates 35 preferably includes a width equal to or larger than a width of a side surface of each of the battery cells 20 (indicating length in length direction of projection piece 25). Further, each of the heat dissipating plates 35 preferably includes a height equal to or larger than a height of the side surface of each of the battery cells 20 in order to efficiently transfer heat that has been transferred from the side surfaces of the battery cells 20 to the heat dissipating plates 35, to the sheet 33. The width and the height of each of the heat dissipating plates 35, however, may be respectively made smaller than the width and the height of each of the battery cells 20.

Each of the heat dissipating plates 35 may be made of one of a rubber-like elastic body, a metal, a ceramic, and a carbon material each including high thermal conductivity. In a case where each of the heat dissipating plates 35 is made of a rubber-like elastic body, a material similar to the material of the sheet 33 described in the first embodiment can be used. Accordingly, to enhance thermal conductivity of the rubber-like elastic body even a little, various kinds of particles of AlN, alumina, aluminum hydroxide, aluminum, cBN, hBN, graphite, carbon, diamond, silicon nitride, copper, or silver, or a filler represented by a fibrous filler, whisker, and a plate-like filler are preferably dispersed in the rubber.

Each of the heat dissipating plates 35 may be made of a material other than the rubber-like elastic body, for example, a metal, a ceramic, a carbon material, or a hard resin. In a case where each of the heat dissipating plates 35 is made of a metal, a metal with relatively high thermal conductivity, such as aluminum, an aluminum alloy, copper, and a copper alloy can be used. In a case where each of the heat dissipating plate 35 is made of a ceramic, aluminum nitride, cBN, alumina, etc. can be used. In a case where each of the heat dissipating plates 35 is made of a carbon material, each of the heat dissipating plates 35 can be formed of a sheet stacked body or a constituent body in which fibers are dispersed or fibers are knitted, in addition to a molded body made of diamond-like carbon, diamond, graphite, or the like. In a case where each of the heat dissipating plates 35 is made of a hard resin, a resin with high heat resistance is preferably used as a base material, and a ceramic, a metal, or a carbon material with thermal conductivity higher than the thermal conductivity of the resin is preferably dispersed into the base material. As the dispersion, for example, various kinds of fillers such as AlN that can be dispersed into the above-described heat dissipating plates 35 can be used.

Figure 6:
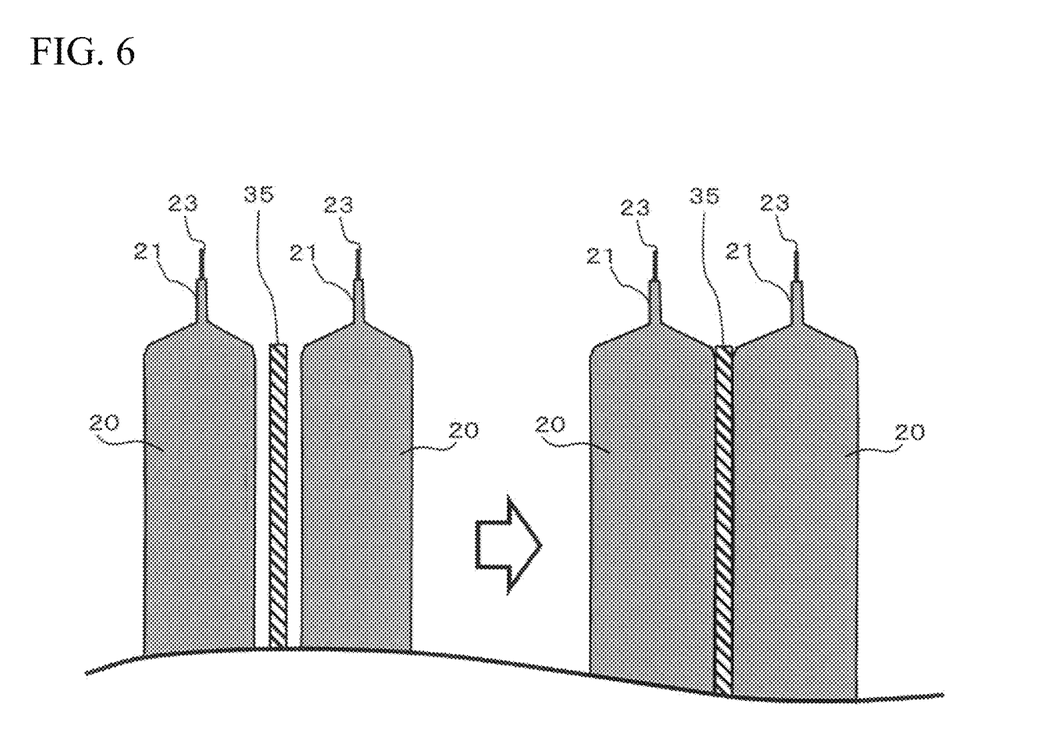
FIG. 6 illustrates change of a state where a heat dissipating plate illustrated in FIG. 5 is disposed in a gap between the battery cells.

FIG. 6 illustrates change of a state where the heat dissipating plate illustrated in FIG. 5 is disposed in the gap between the battery cells.

A thickness of each of the heat dissipating plates 35 is smaller than a width of each of the gaps 18 among the battery cells 20. At the time other than the time of charging and discharging of the battery cells 20 (other than heat generation), the heat dissipating plates 35 do not contact with the side surfaces of the battery cells 20 as illustrated on left side in FIG. 6. In contrast, at the time of charging and discharging of the battery cells 20 (during heat generation), the battery cells 20 expand to reduce the widths of the respective gaps 18. As illustrated on right side in FIG. 6, the heat dissipating plates 35 are in contact with the side surfaces of the battery cells 20 expanded at the time of charging and discharging. Each of the heat dissipating plates 35 includes the thickness such that the heat dissipating plate 35 is in closer contact with the battery cells 20 during the heat generation of the battery cells 20 more than before the heat generation. The thickness of each of the heat dissipating plates 35 is not so thin that the heat dissipating plate 35 does not come into contact with the side surfaces of the battery cells 20 before and during the heat generation of the battery cells 20.

In the present embodiment, a difference between the width of each of the gaps 18 and the thickness of each of the heat dissipating plates 35 is equal to or lower than a difference between the thicknesses before and after expansion of the two battery cells 20. As described above, the heat dissipating plates 35 are not in contact with the battery cells 20 when the battery cells 20 do not generate heat, and the heat dissipating plates 35 are in contact with the battery cells 20 when the battery cells 20 generate heat. Therefore, the heat dissipating plates 35 function as heat dissipating members at the time of charging and discharging of the battery cells 20, and otherwise function as heat-retaining members with intervention of air. Alternatively, the heat dissipating plates 35 each including the thickness equal to or larger than the width of each of the gaps 18 may be provided in the heat dissipating structure 30. In this case, the heat dissipating plates 35 are constantly in contact with the side surfaces of the battery cells 20 before and after the heat generation, and the battery cells 20 expand to more closely contact with the heat dissipating plates 35 during the heat generation of the battery cells 20. Further, it is also preferable that each of the heat dissipating plates 35 include a variable thickness. Examples of the heat dissipating plates 35 include an aluminum plate bonded with a sponge, a sheet that includes a wave-shaped cross-section and is deformable and restorable in a spring shape, and an aluminum plate in which a rubber or gel is partially provided in an island shape.

Third Embodiment

Next, a third embodiment of the present invention is described.

Figure 7:
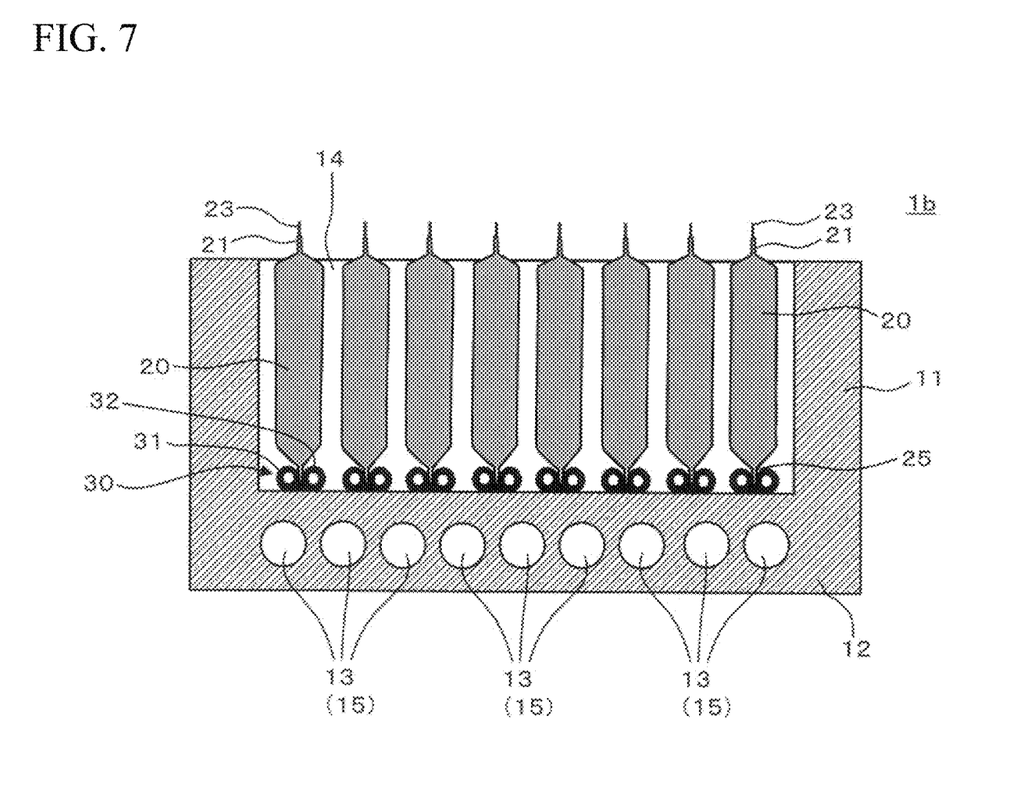
FIG. 7 is a vertical cross-sectional view of a battery including a heat dissipating structure according to a third embodiment.

FIG. 7 is a vertical cross-sectional view of a battery including a heat dissipating structure according to a third embodiment.

The third embodiment is different from the first embodiment in that the heat dissipating structure does not include the sheet of the first embodiment. Other configurations are substantially common to the first embodiment and the third embodiment. Accordingly, matters different from the first embodiment are mainly described below, and overlapped description for the other configurations are omitted through replacement with the above-described description in the first embodiment.

A battery 1b according to the third embodiment includes the heat dissipating structure 30 that does not include the sheet 33. Accordingly, the heat dissipating structure 30 according to the third embodiment only includes the holding members 31 and 32. The holding members 31 and 32 are fixed to the inner surface of the bottom part 12 of the housing 11 while being separated from one another or being joined with one another. The battery cells 20 are retained in the inside 14 of the housing 11 in the state where the respective projection pieces 25 are held by the holding members 31 and 32. The heat generated at the time of charging and discharging of the battery cells 20 is transferred from the respective projection pieces 25 to the bottom part 12 and the cooling member 15 through the holding members 31 and 32. As a result, the heat is efficiently removed from the battery cells 20.

Note that the heat dissipating plates 35 according to the second embodiment may be provided in the battery 1b according to the third embodiment. In this case, the heat dissipating plates 35 are preferably fixed to the inner surface of the bottom part 12 by bonding, joining, or the like. As a modification, each of the heat dissipating plates 35 may be joined with the holding member 32 that fixes one battery cell 20 and the holding member 31 that fixes the battery cell 20 adjacent to the one battery cell 20, and be inserted into the corresponding gap 18 while being floated from the bottom part 12. The heat dissipating structure 30 including such a form does not include the sheet 33 but includes the eight sets of holding members 31 and 32 and seven heat dissipating plates 35. The relationship between the thickness of each of the heat dissipating plates 35 and the width of each of the gaps 18 among the battery cells 20 is same as the relationship described in the second embodiment.

(Modifications)

FIG. 8A to FIG. 8E illustrate various kinds of modifications of the heat dissipating structure.

Figure 8A:
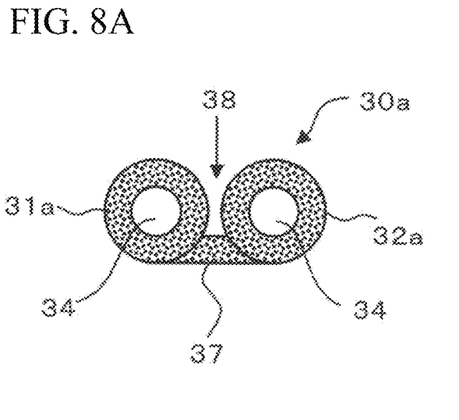
FIG. 8A to FIG. 8E illustrate various kinds of modifications of the heat dissipating structure.

A heat dissipating structure 30a illustrated in FIG. 8A includes a structure in which a holding member 31a and a holding member 32a are disposed on a connection part 37 with a gap 38. The connection part 37 is a member obtained by reducing the width of the sheet 33 of the heat dissipating structure 30 according to the first embodiment. Each of the holding members 31a and 32a includes the through hole 34. The heat dissipating structure 30a includes a form extremely similar to the heat dissipating structure 30 according to the third embodiment. Each of the projection pieces 25 of the respective battery cells 20 is inserted into the gap 38 and is held by the holding members 31a and 32a.

Figure 8B:
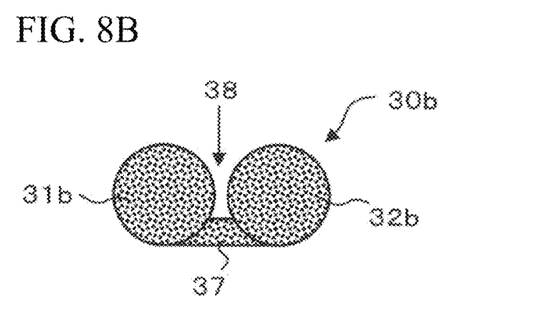

A heat dissipating structure 30b illustrated in FIG. 8B is a structure in which each of holding members 31b and 32b includes a columnar shape without the through hole 34. Other configurations are similar to those of the heat dissipating structure 30a of FIG. 8A. The holding members 31b and 32b are each preferably made of a rubber-like elastic body, and can change the gap 38 to hold each projection piece 25 by elastic deformation of the holding members 31b and 32b themselves even without the through hole 34.

Figure 8C:
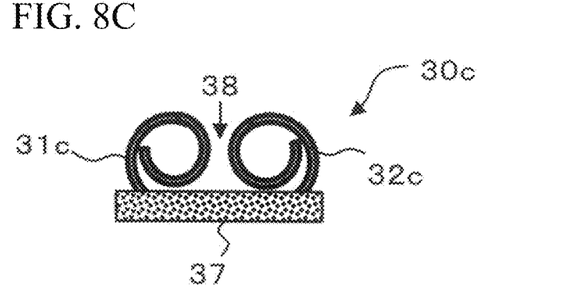

A heat dissipating structure 30c illustrated in FIG. 8C is a structure that includes holding members 31c and 32c each including a cross-section obtained by winding a metal sheet or a metal wire in a coil shape. When each of the projection pieces 25 is inserted into the gap 38 between the holding member 31c and the holding member 32c, the gap 38 deforms and extends such that the holding members 31c and 32c are wound inward. The holding members 31c and 32c are energized in a direction in which the holding members 31c and 32c are returned to original shapes and the gap 38 is returned to the initial state. Each of the projection pieces 25 is held between the holding members 31c and 32c with use of restoring force of the holding members 31c and 32c. In other words, the holding members 31c and 32c can hold the projection pieces 25 by spring deformation. In addition to a pipe-shaped spring member that includes a swirling cross-section like the holding members 31c and 32c, a spring member wound in a spiral shape, etc. can be used. Examples of the material of such a spring-shaped member include spring steel. The connection part 37 is provided in the heat dissipating structure 30c, similarly to the heat dissipating structure 30a of FIG. 8A.

Figure 8D:
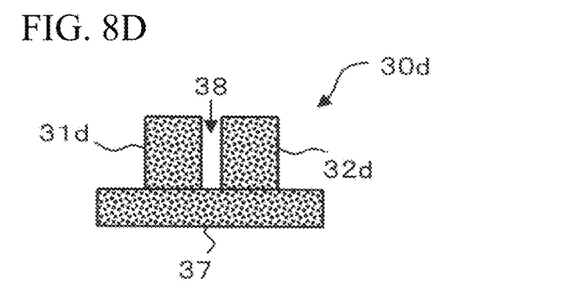

A heat dissipating structure 30d illustrated in FIG. 8D is a structure that includes rectangular parallelepiped holding members 31d and 32d extending in a depth direction of this paper sheet. Other configurations are similar to those of the heat dissipating structure 30b of FIG. 8B. The holding members 31d and 32d are each preferably made of a rubber-like elastic body, and can change the gap 38 to hold each projection piece 25 by elastic deformation of the holding members 31d and 32d themselves even without the through hole 34.

Figure 8E:
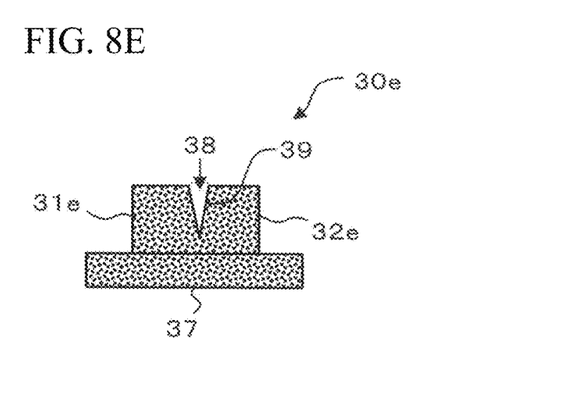

A heat dissipating structure 30e illustrated in FIG. 8E includes one rectangular parallelepiped extending in the depth direction of this paper sheet. The rectangular parallelepiped includes the gap 38 (also referred to as groove 39) including a V-shaped cross-section. Left and right regions of the gap 38 in the figure respectively configure a holding member 31e and a holding member 32e. Other configurations are similar to those of the heat dissipating structure 30d of FIG. 8D. The holding members 31e and 32e are each preferably made of a rubber-like elastic body, and can hold each projection piece 25 in the gap 38 by elastic deformation of the holding members 31e and 32e themselves.

Action and Effects of Embodiments

Each of the heat dissipating structures 30, 30a, 30b, 30c, 30d, and 30e (referred to as "heat dissipating structure 30 etc.") according to the respective embodiments is the heat dissipating structure that is provided between the battery cells 20 and the cooling member 15 and conducts heat from the battery cells 20 to the cooling member 15 to promote heat dissipation from the battery cells 20. In addition, the heat dissipating structures 30, 30a, 30b, 30c, 30d, and 30e respectively include the holding members 31 and 32, the holding members 31a and 32a, the holding members 31b and 32b, the holding members 31c and 32c, the holding members 31d and 32d, and the holding members 31e and 32e (referred to as "holding members 31 and 32, etc.") that detachably hold the end parts (e.g., projection pieces 25) of the respective battery cells 20.

Further, each of the batteries 1, 1a, and 1b (referred to as "battery 1 etc.") according to the respective embodiments includes the battery cells 20 inside the housing 11 that causes contact with the cooling member 15, and includes, between the end parts (e.g., projection pieces 25) of the respective battery cells 20 on the side close to the cooling member 15 and a part (e.g., bottom part 12) of the housing 11 on the side close to the cooling member 15, the heat dissipating structure 30 etc. that conducts the heat from the battery cells 20 to the cooling member 15 to promote the heat dissipation from the battery cells 20. The heat dissipating structure 30 etc. includes the holding members 31 and 32, etc. that can deform to detachably hold the end parts (e.g., projection pieces 25) of the respective battery cells 20 in a closely contact state.

The configurations of the above-described heat dissipating structure 30 etc. and the battery 1 etc. make it possible to enhance heat dissipating property from the battery cells 20 to the cooling member 15, and to make the battery cells 20 and the heat dissipating structure 30 etc. detachable from one another as well. In addition, since the holding members 31 and 32, etc. can deform to come into close contact with the battery cells 20, heat transfer property with the battery cells 20 is high. Moreover, since the heat dissipating structure 30 etc. is attached to the outside of the battery cells 20 and does not enter the inside of the battery cells 20, a risk of leakage of liquid inside the battery cells 20 is reduced.

In the heat dissipating structure 30 etc., the holding members 31 and 32, etc. preferably elastically deform to hold, from both sides, the projection pieces 25 on the outer peripheries of the respective bag-shaped battery cells 20. Accordingly, even in the case where the battery cells 20 each include the deformable bag shape, it is possible to efficiently remove the heat from the battery cells 20 by holding the projection pieces 25 as the sealing edges provided on the outer peripheries of the respective battery cells 20 in the gaps 18 of the holding members 31 and 32, etc., and connecting a part (sheet 33, connection part 37, or holding members 31 and 32, etc.) of the heat dissipating structure 30 etc. to the bottom part 12. The holding members 31 and 32, etc. can elastically deform to change the widths of the respective gaps 18 (see FIG. 8A to FIG. 8E) with respect to the sheet 33 or by themselves. Therefore, the holding members 31 and 32, etc. can easily hold the end parts of the respective battery cells 20 without being configured to be movable.

Moreover, the holding members 31 and 32, etc. are each mainly made of the rubber-like elastic body. Therefore, the holding members 31 and 32, etc. can come close contact with the end parts of the respective battery cells 20, thereby enhancing thermal conductivity. In addition, elastic deformation of the holding members 31 and 32, etc. is more easily achievable. Furthermore, the holding members 31 and 32, etc. each mainly made of the rubber-like elastic body contribute to weight reduction of the battery 1 etc.

The heat dissipating structure 30 etc. preferably further includes the sheet 33 that includes the holding members 31 and 32, etc. and is in contact with the cooling member 15 side. Therefore, it is possible to easily set the heat dissipating structure 30 etc. in the housing 11 of the battery 1 etc. Moreover, the components (e.g., heat dissipating plates 35) other than the holding members 31 and 32, etc. are easily fixed to the heat dissipating structure 30 etc.

The heat dissipating structure 30 etc. preferably further includes the heat dissipating plates 35 that are disposed in the respective gaps 18 among the battery cells 20. This makes it possible to achieve heat removal from the side surfaces of the battery cells 20, and to enhance heat dissipating property of the entire battery cells 20.

In particular, when each of the heat dissipating plates 35 includes the thickness such that the heat dissipating plate 35 is in closer contact with the battery cells 20 during the heat generation of the battery cells 20 more than before the heat generation, it is possible to enhance heat dissipating property at the time of charging and discharging of the battery cells 20. Further, when the thickness of each of the heat dissipating plates 35 is made thin such that the heat dissipating plate 35 does not come into contact with the side surfaces of the battery cells 20 at the time other than the time of charging and discharging of the battery cells 20, it is possible to retain the air in the gaps 18 among the battery cells 20 at the time other than the time of charging and discharging. As a result, it is possible to exert heat retaining property at the time other than the time of charging and discharging. This is beneficial to use of the battery 1 etc. in a cold district. The performance of the battery 1 etc. is deteriorated also by low temperature. Therefore, in the cold district, it is necessary to heat the battery cells 20 in addition to heat removal from the battery cells 20. The heat dissipating plates 35 also can exert a function of controlling temperature of the battery cell 20 within a constant temperature range.

Other Embodiments

Although some preferred embodiments of the present invention have been described above, the present invention is not limited to the embodiments and can be implemented with various modifications.

For example, the holding members 31 and 32, etc. may hold not only the projection pieces 25 located on the lower ends of the respective battery cells 20 but also lower parts of main bodies of the respective battery cells 20 each including the projection piece 25 or lower parts without the projection piece 25 in a case where the projection pieces 25 are not provided at the respective lower ends. Further, the holding members 31 and 32, etc. may hold the side parts or the upper parts of the respective battery cells 20, or the outer peripheries of the respective battery cells 20.

Each of the battery cells 20 does not include the bag-shaped form (like battery pack) but may include a form of a hard container. In such a case, the holding members 31 and 32, etc. preferably hold a part or whole of the outer peripheral parts of the respective battery cells 20, including the lower end parts, the side end parts, and the upper end parts. Alternatively, one set of the holding members 31 and 32, etc. may hold two or more battery cells 20.

The holding members 31 and 32 may be movably provided in the heat dissipating structure 30 etc. In such a case, the holding members 31 and 32, etc. are brought close to the end parts (that may include respective projection pieces 25 in case where projection pieces 25 are provided) of the respective battery cells 20 from both sides to hold the end parts.

The plurality of components in the above-described embodiments can be freely combined except for a case where mutual combination cannot be performed. For example, any of the heat dissipating structures 30a to 30e according to the modifications may be provided in any of the first to third embodiments. Further, the sheet 33 according to the first or second embodiment may be provided in any of the heat dissipating structures 30a to 30e according to the modifications.

The heat dissipating structure according to the present invention also can be used in, for example, a vehicle battery, a chargeable-dischargeable battery for household use, and a battery for a PC and a mobile electronic apparatus.

What is claimed is:

1. A heat dissipating structure comprising:
a support structure; and
a plurality of holding members on the support structure, each of the plurality of holding members being a cylindrical body which is thermally conductive and elastic,
wherein each pair of adjacent holding members of the plurality of holding members is configured to detachably hold, between one of the pair of adjacent holding members and the other of the pair of adjacent holding members, a first end portion projecting from a first face of a battery cell and extending along the battery cell from a second face to a third face of the battery cell, the battery cell further having a second end portion opposite to the first end portion and projecting from a fourth face of the battery cell, and the second end portion having a pair of electrodes of the battery cell, and being free from being held by any pair of adjacent holding members of the plurality of holding members.

2. The heat dissipating structure of claim 1, wherein the adjacent holding members are configured to elastically deform to hold, from both sides, the first end portion of the battery cell.

3. The heat dissipating structure of claim 1, wherein the support structure comprises a sheet having a heat conductive material.

4. The heat dissipating structure of claim 1, further comprising a plurality of heat dissipating plates, wherein each heat dissipating plate of the plurality of heat dissipating plates is between neighboring adjacent holding members of the plurality of holding members.

5. The heat dissipating structure of claim 4, wherein each heat dissipating plate of the plurality of heat dissipating plates is configured to contact a corresponding battery cell during charging or discharging of the corresponding battery cell.

6. The heat dissipating structure of claim 1, wherein the plurality of holding members is positioned on the support structure in a direction of attaching and detaching the battery cell to and from the support structure.

7. The heat dissipating structure of claim 1, wherein a gap between the adjacent holding members is smaller than a thickness of the first end portion of the battery cell.

8. The heat dissipating structure of claim 1, wherein at least one of the plurality of holding members has a length equal to or greater than a length of the first end portion of the battery cell.

9. The heat dissipating structure of claim 1, wherein at least one of the plurality of holding members has a length smaller than a length of the first end portion of the battery cell.

10. The heat dissipating structure of claim 1, wherein a gap between pairs of adjacent holding members of the plurality of holding members is larger than a gap between the adjacent holding members in each of the pairs of adjacent holding members.

11. The heat dissipating structure of claim 1, wherein the support structure and the plurality of holding members are arranged on a bottom of a U-shaped housing.

12. The heat dissipating structure of claim 1, wherein each of the plurality of holding members includes a through hole that penetrates from one end to another end of the cylindrical body, at a position of a center axis of the cylindrical body.

13. The heat dissipating structure of claim 1, wherein
the cylindrical body of each of the plurality of holding members comprises
an elastically deformable material occupying at least 50% of a volume of the cylindrical body, and
particles dispersed in the elastically deformable material,
the elastically deformable material comprises at least one selected from the group consisting of silicone rubber, urethane rubber, isoprene rubber, ethylene-propylene rubber, natural rubber, ethylene propylene diene rubber, nitrile rubber (NBR), styrene-butadiene rubber (SBR), urethane-based elastomer, ester-based elastomer, styrene-based elastomer, olefin-based elastomer, butadiene-based elastomer, fluorine-based elastomer, and urethane-based elastomer impregnated with silicone, and the particles comprise at least one selected from the group consisting of AlN, alumina, aluminum hydroxide, aluminum, cBN, hBN, graphite, carbon, diamond, silicon nitride, copper, and silver.

14. The heat dissipating structure of claim 13, wherein
the cylindrical body of each of the plurality of holding members further comprises a filler dispersed in the elastically deformable material, and
the filler comprises at least one selected from the group consisting of fibrous filler, whisker, and plate-shaped filler.

15. A battery, comprising:
a housing;
a plurality of battery cells inside the housing, wherein each battery cell of the plurality of battery cells comprises a first end portion projecting from a first face of the battery cell and extending along the battery cell from a second face to a third face of the battery cell;
a cooling member; and
a heat dissipating structure between the cooling member and the plurality of battery cells, wherein the heat dissipating structure comprises:
a plurality of holding members, each of the plurality of holding members being a cylindrical body which is thermally conductive and elastic,
wherein each pair of adjacent holding members of the plurality of holding members is configured to detachably hold, between one of the pair of adjacent holding members and the other of the pair of adjacent holding members, the first end portion of a corresponding battery cell of the plurality of battery cells, and the heat dissipating structure is configured to transfer heat from the plurality of battery cells to the cooling member,
the battery cell further having a second end portion opposite to the first end portion and projecting from a fourth face of the battery cell, and
the second end portion having a pair of electrodes of the battery cell, and being free from being held by any pair of adjacent holding members of the plurality of holding members.

16. The battery of claim 15, wherein each holding member of the plurality of holding members is elastically deformable.

17. The battery of claim 16, wherein the adjacent holding members are configured to deform to hold, from both sides, the end portion of the corresponding battery cell of the plurality of battery cells.

18. The battery of claim 15, wherein each battery cell of the plurality of battery cells comprises a bag-shaped battery cell.

19. The battery of claim 15, wherein each holding member of the plurality of holding members comprises an elastic body.

20. The battery of claim 15, wherein the heat dissipating structure further comprises a sheet supporting the plurality of the holding members.

21. The battery of claim 20, wherein the sheet contacts the cooling member.

22. The battery of claim 15, further comprising a plurality of heat dissipating plates, wherein each heat dissipating plate of the plurality of heat dissipating plates is between adjacent battery cells of the plurality of battery cells.

23. The battery of claim 20, further comprising a plurality of heat dissipating plates, wherein each heat dissipating plate of the plurality of heat dissipating plates is between neighboring adjacent holding members of the plurality of holding members.

24. The battery of claim 22, wherein each heat dissipating plate of the plurality of heat dissipating plates has a thickness such that each heat dissipating plate contacts at least one battery cell of the plurality of battery cells during heat generation of the plurality of battery cells.

25. The battery of claim 24, wherein the thickness is such that each heat dissipating plate of the plurality of heat dissipating plates is spaced from each battery cell of the plurality of battery cells prior to heat generation of the plurality of battery cells.

26. A battery, comprising:
a housing;
a plurality of battery cells inside the housing, wherein each battery cell of the plurality of battery cells comprises a first end portion projecting from a first face of the battery cell and extending along the battery cell from a second face to a third face of the battery cell;
a cooling member; and
a heat dissipating structure between the cooling member and the plurality of battery cells, wherein the heat dissipating structure comprises:
a support structure, and
a plurality of holding members on the support structure, each of the plurality of holding members being a cylindrical body which is thermally conductive and elastic,
wherein each pair of adjacent holding members of the plurality of holding members is configured to hold, between one of the pair of adjacent holding members and the other of the pair of adjacent holding members, the first end portion of a corresponding battery cell of the plurality of battery cells, and the heat dissipating structure is configured to transfer heat from the plurality of battery cells to the cooling member,
the battery cell further having a second end portion opposite to the first end portion and projecting from a fourth face of the battery cell, and
the second end portion having a pair of electrodes of the battery cell, and being free from being held by any pair of adjacent holding members of the plurality of holding members.

27. The battery of claim 26, further comprising a plurality of heat dissipating plates, wherein each heat dissipating plate of the plurality of heat dissipating plates is between adjacent battery cells of the plurality of battery cells.

* * * * *